United States Patent
Tzou

Patent Number: 5,881,098
Date of Patent: Mar. 9, 1999

[54] EFFICIENT DEMODULATION SCHEME FOR DSSS COMMUNICATION

[75] Inventor: Ching-Kae Tzou, Chupei, Taiwan

[73] Assignee: Industrial Technology Research Institute, Taiwan

[21] Appl. No.: 604,473

[22] Filed: Feb. 21, 1996

[51] Int. Cl.⁶ .................................................. H04B 1/707
[52] U.S. Cl. .......................................... 375/206; 375/207
[58] Field of Search ..................................... 375/200, 206, 375/207, 208, 343

[56] References Cited

U.S. PATENT DOCUMENTS

| | | | |
|---|---|---|---|
| 4,716,376 | 12/1987 | Daudelin | 375/334 X |
| 4,969,159 | 11/1990 | Belcher et al. | 375/207 |
| 5,023,889 | 6/1991 | Davsalar et al. | 375/244 |
| 5,148,452 | 9/1992 | Kennedy et al. | 375/343 |
| 5,181,225 | 1/1993 | Neeser et al. | 375/350 |
| 5,204,875 | 4/1993 | Mower et al. | 375/200 |
| 5,313,493 | 5/1994 | Dutta | 375/283 |
| 5,343,496 | 8/1994 | Honig et al. | 370/342 |
| 5,353,301 | 10/1994 | Mitzlaff | 375/200 |
| 5,361,276 | 11/1994 | Subramanian | 375/200 |
| 5,363,403 | 11/1994 | Schilling et al. | 370/441 |
| 5,377,226 | 12/1994 | Davis | 370/342 |
| 5,420,889 | 5/1995 | Juntti | 375/346 |
| 5,446,763 | 8/1995 | Baum et al. | 375/340 |
| 5,452,327 | 9/1995 | Barham et al. | 375/208 |
| 5,559,828 | 9/1996 | Armstrong et al. | 375/200 |
| 5,745,529 | 4/1998 | Hikoso et al. | 375/316 |

*Primary Examiner*—Young T. Tse
*Attorney, Agent, or Firm*—Fish & Richardson P.C.

[57] ABSTRACT

A DSSS receiver for processing a complex spread-spectrum signal which contains source information, the receiver including a despreading circuit which despreads a first complex signal that is derived from the spread-spectrum signal to produce a second complex signal; a differential demodulator which differentially demodulates the second complex signal to generate a third complex signal; and a sum and dump circuit which during each of successive symbol periods of the third complex signal sums multiple samples of the third complex signal to produce a fourth complex signal, wherein decision processing is performed in the fourth complex signal to extract the source information.

13 Claims, 3 Drawing Sheets

EFFICIENT DEMODULATION SCHEME FOR DSSS COMMUNICATION

BACKGROUND OF THE INVENTION

The invention relates generally to direct-sequence spread-spectrum (DSSS) communication systems.

Spread-spectrum is a transmission technique according to which the bandwidth of the transmitted signal is intentionally increased (usually substantially) beyond the minimum bandwidth that is necessary to send the information. The "spreading" of the bandwidth is accomplished by a code or a spreading signal that is independent of the data. At the receiver, the same code or spreading signal is used to despread the received signal to recover the original signal.

One reason for wanting to increase the signal bandwidth is that the power that is required to maintain a given channel capacity decreases as the bandwidth of the channel increases. In addition, the signal to noise ratio of the transmitted signal becomes larger due to its being spread across a larger bandwidth and thus the transmitted signal is less susceptible to co-channel interference or hostile jamming signals.

Direct-sequence spread-spectrum, which is a common spread-spectrum technique, is a double sideband, suppressed carrier modulation technique which uses a code that has a polar waveform. In other words, the spread spectrum signal, s(t) is generated from the message r(t) as follows:

$$s(t) = A_c \cdot r(t) \cdot c(t),$$

where c(t) is the spreading signal having a polar waveform.

In a typical DSSS communication system, such as a system that conforms to the IEEE 802.11 standard, the transmit signal is spread by a finite length sequence (e.g. a barker code of length 11) and then modulated by a differential QPSK (Quadrature-Phase-Shift-Keyed) modulator. At the receiver end, the reverse process is performed. That is, the received signal is first despread by the same sequence and then demodulated by a corresponding differential QPSK detector. The signal can be either despread by a linear correlator for simplicity or by a matched filter for fast acquisition purpose. Despreading by a matched filter is usually utilized for a short preamble system like IEEE 802.11 due to the need for fast acquisition.

The operation of a match filter can be formulated as follows:

$$m(t) = \sum_{i=0}^{L-1} c_i \cdot r(t - iT_c) \qquad \text{Eq. 1}$$

where m(t) denotes the match filter output, L is the spreading code length, r(t) is the receive (baseband) signal, $T_c$ is the chip time period, and $$\{c_i\}_{i=0}^{L-1}$$

represents the spreading code.

A conventional spreading and despreading scheme is illustrated in FIG. 1. In this system, a received spread spectrum signal 10 is mixed with a locally generated reference signal to generate a corresponding baseband signal. A match filter 12, such as the one described above, despreads the baseband signal. A power detector 14 monitors the output of match filter 12. If instantaneous receive signal power exceeds a preset threshold at a specific (sampling) time epoch, the match filter output is sampled and held in a peak hold circuit 16 until a differential demodulator 18 differentially demodulates the signal and a QPSK decision circuit 20 extracts the desired source information. Timing recovery is performed based on the occurrences of signal peaks. The recovered timing information is then applied to other signal processing blocks that require the timing information to correctly perform their functions (e.g. the frequency discriminator, the differential demodulator, the QPSK decision module, etc.). A frequency discriminator 22 determines the frequency error and controls a local oscillator 24 (also labeled L.O.) to compensate for the frequency error that is incurred during signal propagation. Typically, the phase and frequency errors come from the time-variant characteristics of the propagation channel and the mobility of mobile unit.

Other conventional techniques which apply a match filter in a DSSS communication system are described in U.S. Pat No. 5,377,226; U.S. Pat. No. 5,343,496; U.S. Pat. No. 5,204,875; U.S. Pat. No. 5,181,225; and U.S. Pat. No. 5,363,403. In general, in such other techniques, the signal at the match filter's output is first passed through a QPSK slicer (i.e., it is hard decisioned), and then, the sliced signal is differentially demodulated to recover the transmitted information.

Conventional methods have several implied characteristics. First, some circuits, which might be either optimal or sub-optimal, are necessary to determine instants at which to sample the match filter output. Typically, only a power peak within a symbol period at the match filter output is processed. For example, the match filter output signal is sampled at the time epoch corresponding to the peak and held until decision is made. All other peaks and their associated match filter output samples that occur within the same symbol period are discarded. Secondly, symbol timing information is determined and performed based solely upon the selected peaks. Third, frequency and phase errors are detected and compensated for based on the outputs of the differential demodulator.

SUMMARY OF THE INVENTION

In general, in one aspect, the invention is a DSSS receiver for processing a complex spread-spectrum signal which contains source information. The receiver includes a despreading circuit which despreads a first complex signal that is derived from the spread-spectrum signal to produce a second complex signal; a differential demodulator which differentially demodulates the second complex signal to generate a third complex signal; and a sum and dump circuit which during each of successive symbol periods of the third complex signal sums multiple samples of the third complex signal to produce a fourth complex signal. Decision processing is performed in the fourth complex signal to extract the source information.

Preferred embodiments include the following features. The receiver further includes a mixer which multiplies the complex spread-spectrum signal by quadrature and in-phase components of a complex reference signal to generate the first complex signal. The despreading circuit is a match filter or alternatively, it is a linear correlator. The receiver also includes a power detector which controls operation of the sum and dump circuit based on another signal in the apparatus (e.g. the second complex signal). Alternatively, the power detector controls operation of the differential demodulator based on another signal in the apparatus (e.g. the second complex signal). In addition, there is also a QPSK decision module which extracts the source information from the fourth complex signal. The differential demodulator includes a delay circuit which delays the second complex signal by a symbol period to generate a delayed signal; a module which generates a complex conjugate of the delayed signal; and a multiplier which multiplies the second complex signal by the complex conjugate of the delayed signal to produce the third complex signal.

In one aspect, the invention combines a conventional match filter and a differential, quadrature-phase-shift-keyed (DQPSK) demodulator. More specifically, the match filter output signal is first differentially demodulated and then a normal QPSK decision (slicing) is performed to recover the transmitted information.

The demodulation scheme of the invention provides an efficient method to positively combine the received signal energies of multipath signals so that detection performance is improved in a typical frequency-selective indoor wireless communication environment. The invention is different from the conventional signal reception methods in that positive information is not discarded before the decision point. The invention can be applied to any direct-sequence spread spectrum and differential modulation/demodulation based communication systems. Typically, such communication systems can be found in wireless LANs (e.g. IEEE 802.11), digital cordless phones, and cellular phones, just to name three common applications.

In general, the invention potentially performs as well as any conventional DSSS receiver when the channel is ideal, i.e., when the communication channel introduces Additive White Gaussian Noise (AWGN) only and no multipath effects to the signal. In addition, it typically performs better than the conventional DSSS receiver when multipath signals occur. The actual performance gain, of course, depends on the multipath characteristics of the environment.

In summary, the demodulation and decision scheme of the invention has the advantages that its performance is robust to different or varying signal-to-noise ratios at the receiver. This is primarily due to not discarding any useful signal samples and combining them to make the final QPSK decision. Also, both the frequency and timing synchronization are easy to achieve and no complicated circuits or techniques are required.

Other advantages and features will become apparent from the following description of the preferred embodiments and from the claims.

Note that in all figures, a pair of parallel lines represents a complex signal including an in-phase (denoted as 0° degree) signal and a quadrature-phase (denoted as 90° degree) signal. Also, an arrow indicates the direction of a signal flow, and a dashed line represents a control signal.

Also, in the figures to simplify the description like elements in different figures are numbered identically.

DESCRIPTION OF THE PREFERRED EMBODIMENTS

Figure 1:
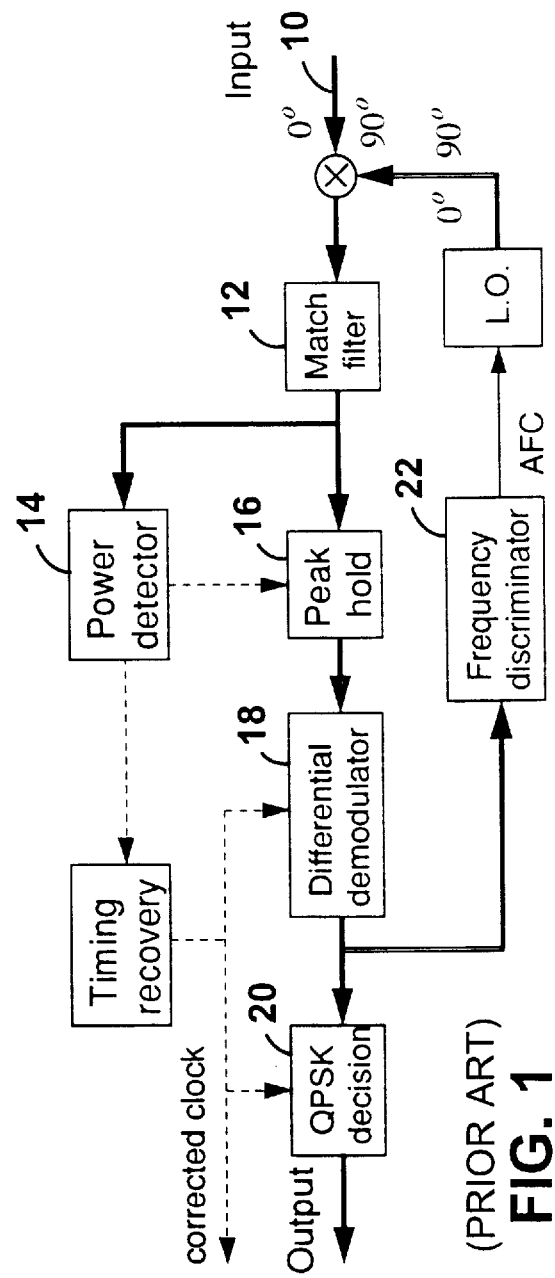
FIG. 1 is a block diagram of a conventional despreading circuit which uses a match filter with differential QPSK demodulation.
Figure 2:
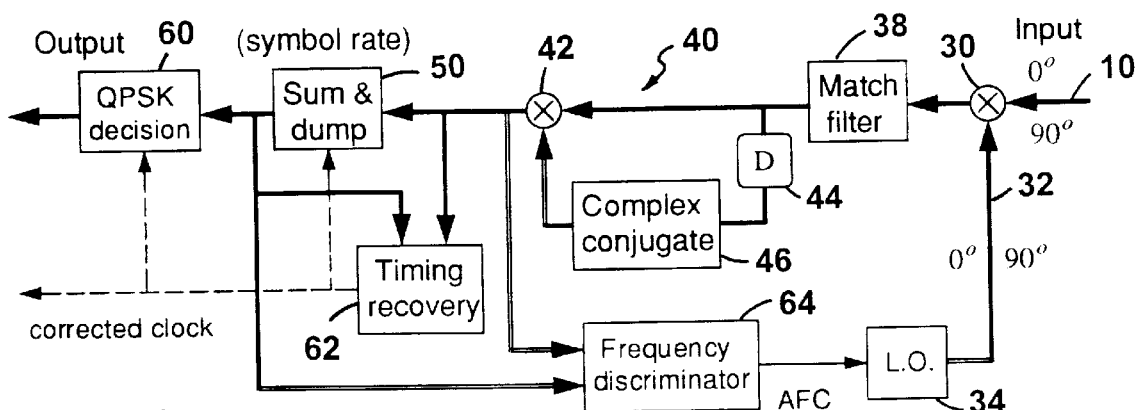
FIG. 2 is a block diagram of one embodiment of the invention.

Referring to FIG. 2, in a DSSS demodulation system constructed in accordance with the invention, a complex received signal 10 passes through a mixer 30 which multiplies that signal by a complex reference signal 32 supplied by a local oscillator (L.O.) 34. Mixer 30 multiplies the quadrature and in-phase components of complex received signal 10 by respective quadrature and in-phase components of a reference signal 32 to generate a baseband signal. A match filter 38 then despreads the output signal of mixer 30 by multiplying the samples of the output signal by the appropriate code (e.g. see Eq. 1, above). Next, a differential demodulator 40 multiplies each sample of the match filter output signal by a corresponding sample of the complex conjugate of the match filter output signal delayed by one symbol period. In other words, differential demodulator 40 performs correlation of the match filter output samples of the I-channel and the Q-channel spaced a symbol period apart in time That is:

$$d(t)=m(t)m^*(t-T_s)$$

where $d(t)$ is the output of the differential demodulator, $m(t)$ is the match filter output signal, $T_s$ represents a symbol period, and * represents the complex conjugate operation.

Differential demodulator 40 includes a multiplier circuit 42 which multiplies two input signals. One input signal is the output signal of match filter 38. The other input signal is generated by passing the match filter output signal first through a delay circuit 44 which delays the signal by one symbol period and then through a second circuit 46 which produces the complex conjugate of the delayed signal.

After differential demodulator 40, a sum and dump circuit (S&D) 50 (also referred to as an integrate and dump circuit) sums the correlation results over a symbol period and dumps those results for further processing. The design and implementation of sum and dump circuits is well nown to persons skilled in the art. In general, its operation can be decomposed into two steps. First, the S&D accumulates (i.e., sums or integrates) its input signal values during a certain period of time (typically, a symbol period). Then, it outputs (i.e., dumps) the accumulated value to subsequent signal processing modules at the end of the accumulation period and resets its contents to zero. That operation is repeat again during the next certain period of time.

The sum and dump operation is represented as follows:

$$\tilde{I}(t)+j\tilde{Q}(t)=S\&D[d(t)].$$

Finally, a QPSK decision circuit 60, using techniques known to persons skilled in the art, recovers the transmitted information from the output of sum and dump circuit 50.

The system also includes other components which are typically found in DSSS receivers. For example, it also includes a timing recovery circuit 62, which generates a corrected clock signal that controls the starting epoch of the sum and dump operation, and it includes a frequency discriminator 64, which determines the frequency error in the baseband signal and controls local oscillator 34 so as to compensate for any the frequency error that occurs during signal propagation. Both timing recovery circuit 62 and frequency discriminator 64 may be designed and constructed in a manner that as is well known to persons skilled in the art. Also, one feature of the invention is that the symbol timing recovery technique that is implemented can be as simple and reliable as that which is used in an ordinary QPSK signal receiver. That is, no sliding window or similar circuit is needed.

The following example helps explain why the DSSS system of FIG. 2 potentially performs better than conventional DSSS systems. In a typical indoor environment, for example, when two or more signal paths exist which produce multipath signals of equal amplitude but separated in time by more than a chip period, the conventional receiver selects one of the multipath signals for making a decision and discards the other multipath signal by, for example, using the rule of maximum-selection. In contrast, the system of FIG. 2 combines these two multipath signals by aligning their corresponding phases and thereby achieving a gain in terms of signal-to-noise ratio (SNR) of about 3 dB relative to the conventional system. Note that the performance gain by the system of FIG. 2 will typically be less than 3 dB if the two multipath signals are not equal in amplitude. However, the performance gain will typically be more than 3 dB when more than two significant multipath signals are produced and reach the receiver.

Figure 3:
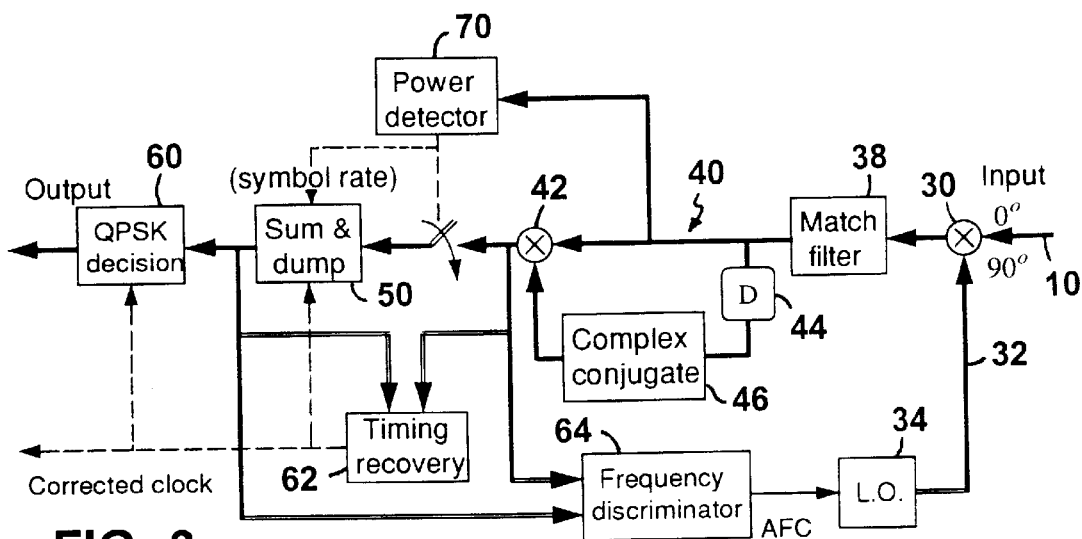
FIG. 3 is a block diagram of a modified version of the system shown in FIG. 2.

Referring to FIG. 3, an optional circuit like a power detector 70 can be used to assist the sum and dump operation such that the summation takes place only when the multiplication result from match filter 38 exceeds a preset threshold. Thus, within a symbol period, only "significant" values are utilized and the number of summation operations is significantly reduced, as compared to the circuit of FIG. 2.

Figure 4:
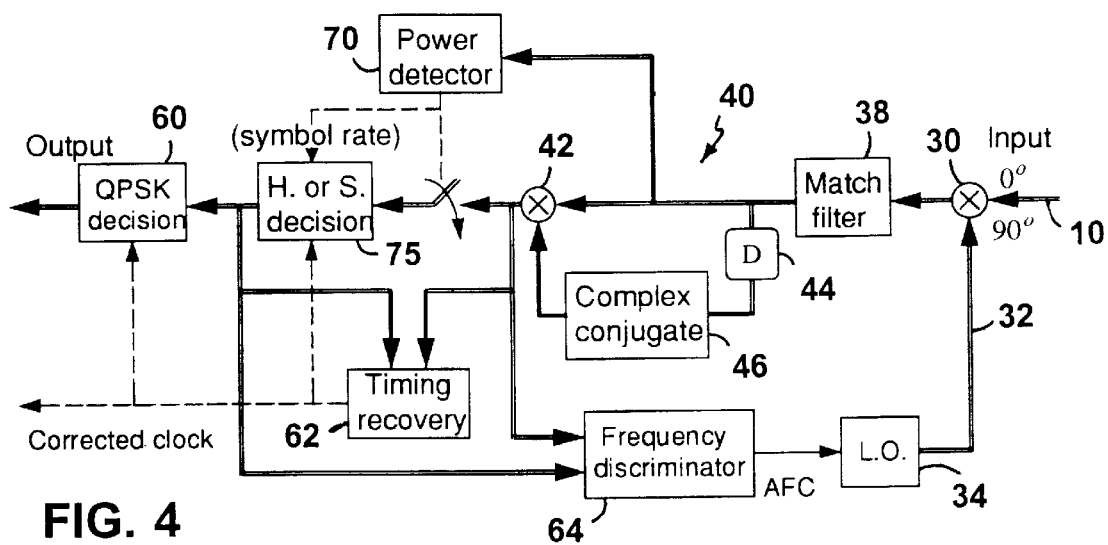
FIG. 4 is a block diagram of a despreading circuit which uses a hard/soft decision circuit in place of the sum and dump circuit of FIG. 2.

We should also note that the sum and dump operation is not necessarily required. If some performance degradation is acceptable, it can be replaced by a module 75 which implements a simple hard (or soft) decision algorithm, as illustrated in FIG. 4 Persons skilled in the art are familiar with how to construct and implement such a module. Thus, rather than providing the details here, the reader is referred to well known communication textbooks. Suffice it to say that the hard or soft decision module performs quantization on its input signal. Comparing input signal with different levels of thresholds, the module outputs a value corresponding to the threshold that is nearest to the input signal level. In general, hard decision means the module outputs only two possible values, namely, 0 or 1. Whereas, soft decision means that more than two output values are possible. An analog-to-digital converter is a common device that has the same functionality as just described. In FIG. 4, the input signal to hard or soft decision module 75 is already in digital form; thus, module 75 quantizes the input digital signal further into fewer levels such that the required number of bits for subsequent signal processing is reduced.

In this present case, the decision can be set to a positive value (typically, +1) when the decision input exceeds a decision threshold and set to zero otherwise. This modification would further simplify the overall system while still retaining most of its performance advantages.

Figure 5:
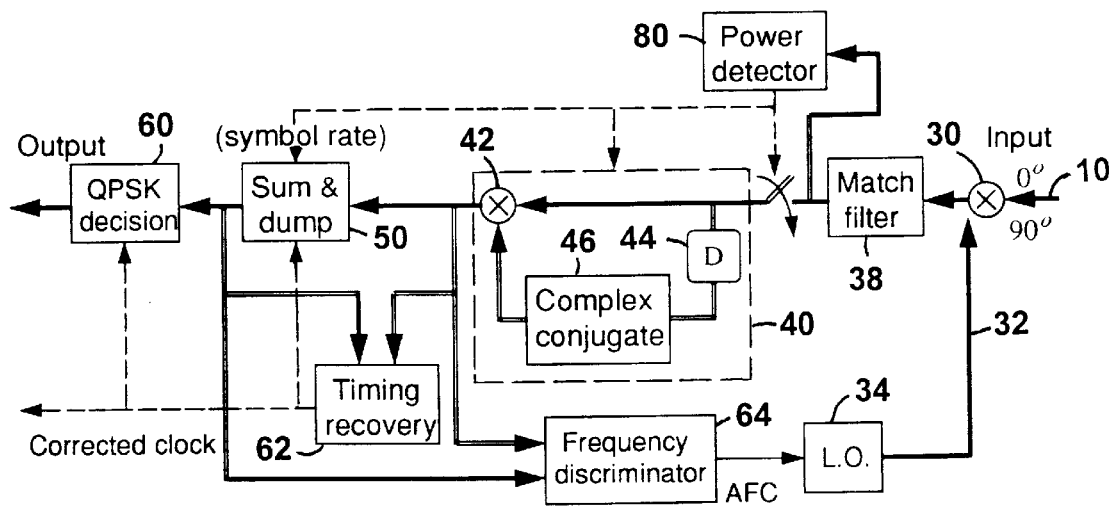
FIG. 5 is a block diagram of a despreading circuit in which the power detector controls the operation of the differential demodulator.

Other simplifications are also possible. For example, as shown in FIG. 5, a simple power detector 80 that indicates the occurrence of a significant signal can be used to control the sampling instants and the operation of differential demodulator 40 and sum and dump circuit 50. In that case, differential demodulator 40 would only perform its operations when a meaningful signal occurs. This is a way of significantly reducing the number of numerical operations that differential demodulator 40 needs to perform.

As noted above, a linear correlator (i.e., a combination of a multiplier and a sum and dump circuit) can be used instead of a match filter to despread the received spread-spectrum signal. Both of these approaches are well known in the art. Both perform signal de-spreading but in different ways. More specifically, the matched filter despreads the received signal in parallel whereas the linear correlator de-spreads the received signal serially. In the matched filter, the received signal is shifted into a bank of registers every chip time (or every sample time) and the contents of these registers are weighted by a de-spreading code (for example +1, −1,+1,+1, −1, +1, +1, +1, −1, −1, −1 in the IEEE 802.11 standard) and summed together to produce the so-called matched filter output. In the linear correlator, the despreading code is generated one by one (i.e., serially) every chip time and multiplied (i.e., correlated) with the received signal. The generation rate of the de-spreading code is controlled by an external clock signal. The multiplication (correlation) results are then accumulated (integrated) serially in time over a de-spreading period. Typically, the de-spreading period is a symbol period. At the end of the de-spreading period, the summation (integrated) result is output (i.e., dump) to the next stage, and the content of the accumulator (integrator) is reset to zero. Therefore, the dump operation is performed every de-spreading period.

Note that the above-described modules can be implemented by software running on a computer or a digital signal processor, using such techniques as are well known in the art. They can, of course, also be implemented by dedicated, hard-wired circuit components. It is intended that both implementations in software and hardware fall within the scope of the invention.

It should also be understood that in the circuits shown in FIGS. 2–5, some of the identically numbered components may be implemented differently depending upon the specific requirements of the system.

Other embodiments are within the following claims. For example, a numerical controlled oscillator can be used instead of a local oscillator. In addition, each of the circuits for implementing timing recovery and/or frequency discrimination may be implemented in any one of the different ways known to persons skilled in the art and for input signals they may use output signals other than those shown in the figures. In general, for all of the components, the requirement that is of primary importance is the function(s) that the component performs and not the particular details of circuit implementation. Also, it should be understood that the input signal can be either digital or analog and the system can be implemented either partially or wholly in analog form, i.e., with some or all of the signals being analog.

What is claimed is:

1. A DSSS receiver for processing a complex spread-spectrum signal which contains source information, said receiver comprising:

a despreading circuit which despreads a first complex signal that is derived from the spread-spectrum signal to produce a second complex signal;

a differential demodulator which is directly coupled to the despreading circuit and which differentially demodulates the second complex signal to generate a third complex signal; and a sum and dump circuit which during each of successive symbol periods of the third complex signal sums multiple samples of the third complex signal to produce a fourth complex signal, wherein decision processing is performed in the fourth complex signal to extract the source information;

wherein the differential demodulator includes:

a delay circuit which delays the second complex signal by a symbol period to generate a delayed signal;

a module which generates a complex conjugate of the delayed signal; and a multiplier which multiplies the second complex signal by the complex conjugate of the delayed signal to produce the third complex signal.

2. The receiver of claim 1 further comprising a mixer which multiplies the complex spread-spectrum signal by quadrature and in-phase components of a complex reference signal to generate said first complex signal.

3. The receiver of claim 1 wherein the despreading circuit is a match filter.

4. The receiver of claim 1 wherein the despreading circuit is a linear correlator.

5. The receiver of claim 1 further comprising a power detector which controls operation of the sum and dump circuit based on the spread-spectrum signal.

6. The receiver of claim 1 further comprising a power detector which controls operation of the sum and dump circuit based on the second complex signal.

7. The receiver of claim 1 further comprising a QPSK decision module which extracts the source information from the fourth complex signal.

8. The receiver of claim 7 further comprising a power detector which controls operation of the differential demodulator based on the spread-spectrum signal.

9. The receiver of claim 7 further comprising a power detector which controls operation of the differential demodulator based on the second complex signal.

10. A DSSS receiver for processing a complex spread-spectrum signal which contains source information, said receiver comprising:

a despreading circuit which despreads a first complex signal that is derived from the spread-spectrum signal to produce a second complex signal;

a differential demodulator which is directly coupled to the despreading circuit and which differentially demodulates the second complex signal to generate a third complex signal; and a circuit which is directly coupled to the differential demodulator and which during each of successive symbol periods performs quantization on the third complex signal to produce a fourth complex signal, wherein decision processing is performed in the fourth complex signal to extract the source information.

11. The receiver of claim 10 wherein the quantization circuit performs a hard decision quantization.

12. The receiver of claim 10 wherein the quantization circuit performs a soft decision quantization.

13. A DSSS receiver of claim 10 wherein the differential demodulator includes:

a delay circuit which delays the second complex signal by a symbol period to generate a delayed signal;

a module which generates a complex conjugate of the delayed signal; and a multiplier which multiplies the second complex signal by the complex conjugate of the delayed signal to produce the third complex signal.

* * * * *